United States Patent [19]

Hobson

[11] 4,178,003
[45] Dec. 11, 1979

[54] O-RING AND APPARATUS AND METHOD OF MANUFACTURE

[75] Inventor: Carroll D. Hobson, Goshen, Ind.

[73] Assignee: Goshen Rubber Co., Inc., Goshen, Ind.

[21] Appl. No.: 776,730

[22] Filed: Mar. 11, 1977

[51] Int. Cl.² ............................................. F16J 15/54
[52] U.S. Cl. ................................................ 277/237 R
[58] Field of Search ................ 277/207 A, 237 R, 165

[56] References Cited

U.S. PATENT DOCUMENTS

| | | | |
|---|---|---|---|
| 1,814,678 | 7/1931 | Ferguson | 277/207 A |
| 3,432,176 | 3/1969 | Valenziano | 277/207 A |
| 3,528,669 | 7/1966 | Tondato | 277/237 |
| 3,741,570 | 6/1973 | Garrett | 277/207 A |
| 3,951,420 | 4/1976 | Gritzka | 277/207 A |

*Primary Examiner*—Robert I. Smith
*Attorney, Agent, or Firm*—Trexler, Wolters, Bushnell & Fosse, Ltd.

[57] ABSTRACT

In the manufacture of O-rings by compression molding, the mold parts are so shaped as to provide the O-ring with a flattened sealing surface along the outer and inner peripheral portions of the ring, with the mold parting line along one margin of each sealing surface. Optionally the ring may be provided with additional annular flattened sealing surfaces at the upper and lower peripheral portions of the ring body.

6 Claims, 13 Drawing Figures

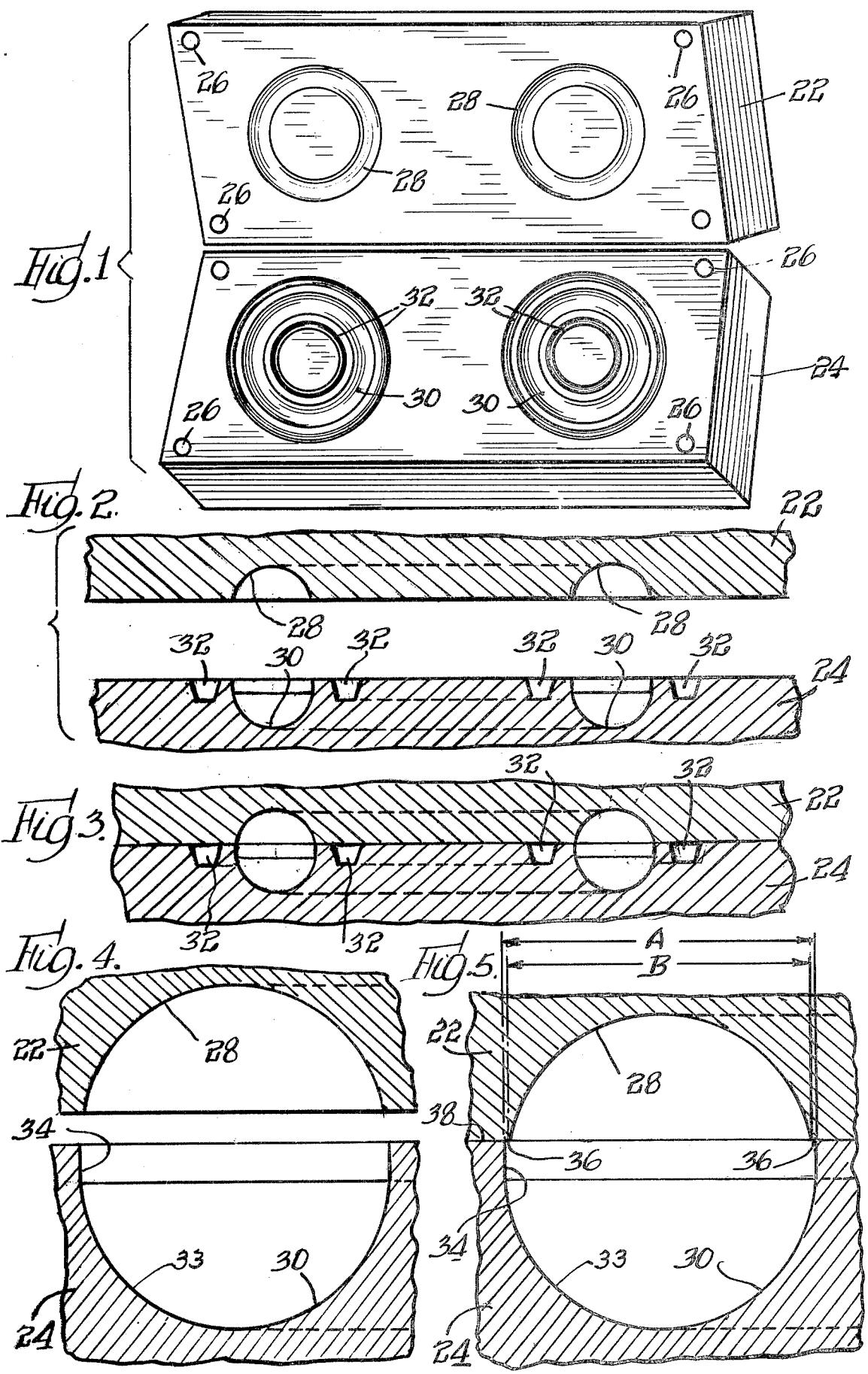

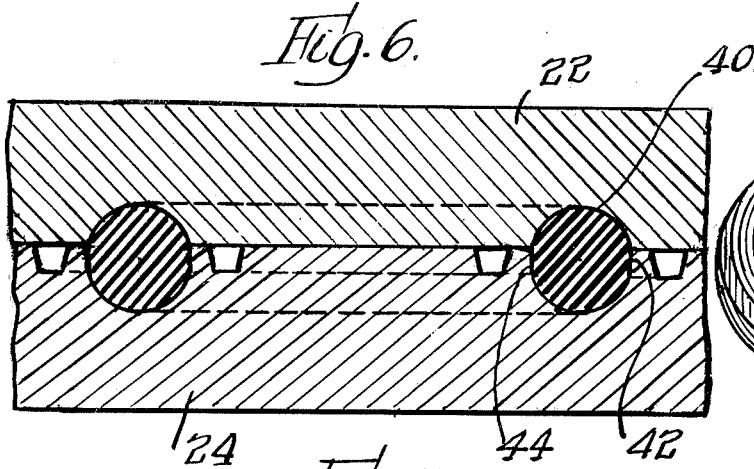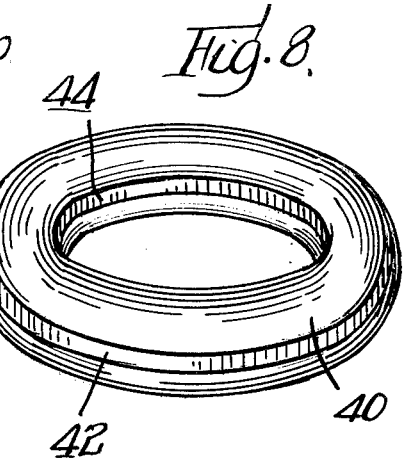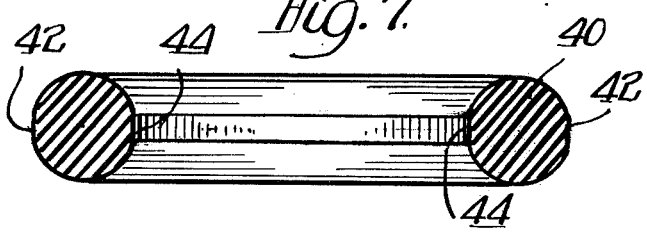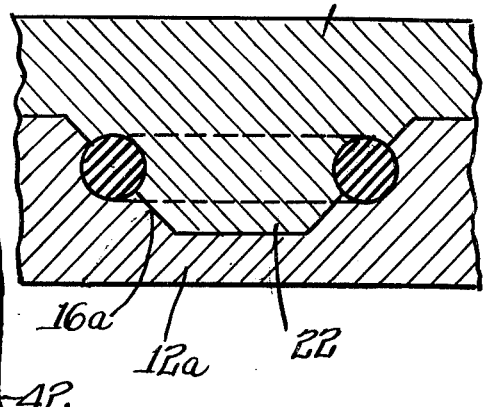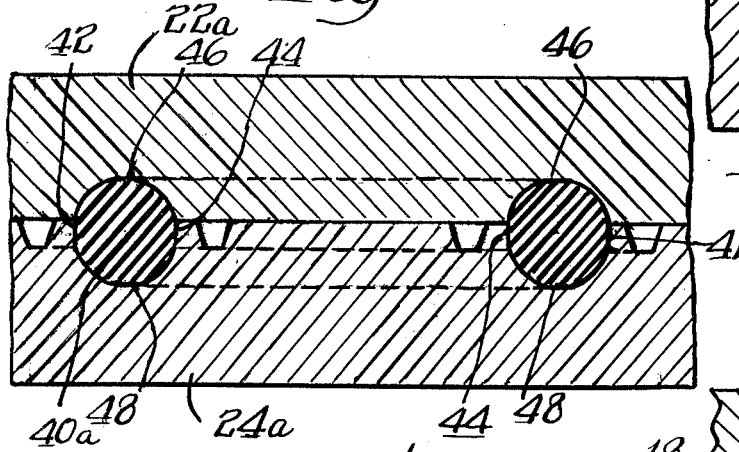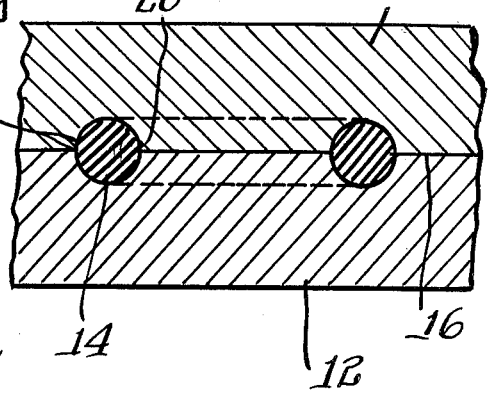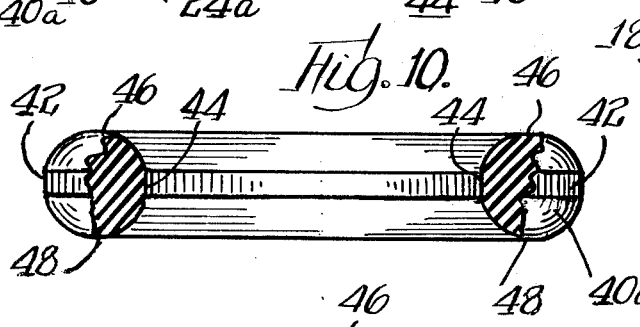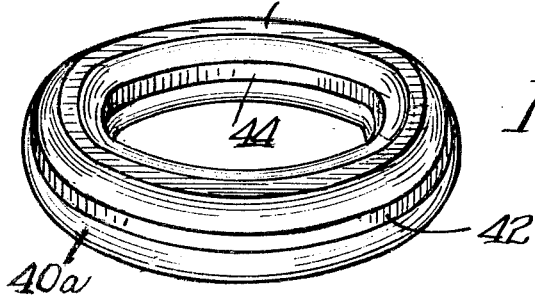

4,178,003

O-RING AND APPARATUS AND METHOD OF MANUFACTURE

This invention relates to O-rings, and to apparatus and methods for making O-rings.

GENERAL STATEMENT

In the conventional manufacture of O-rings, by compression molding, the mold parts are so shaped and arranged that a ring is produced which is generally round in radial cross-section, with the mold parting line diametrically positioned along the outer and inner peripheral surfaces. These surfaces become the sealing surfaces, in most of the uses for the rings. In effecting a seal, the ring becomes flattened to a degree along these sealing surfaces, depending upon the particular use; and difficulty is encountered in that the flash produced between the mold parts during the molding operation, lies directly along the sealing surface, interfering with proper usage in some instances, or in others requiring expensive flash removal processing.

To avoid the foregoing difficulties, in the compression molding of O-rings, the mold parts have sometimes been formed with a conical projection on one mold part projecting into a conical recess on the other, so that the mold parting line in the completed O-ring becomes disposed at an angle with respect to the horizontal, when considered in radial cross-section, thereby avoiding the location of the flash resulting from the parting line, at the critical sealing area. However, this expedient requires considerable expense in the making of the molds.

A further difficulty in the more conventional arrangement above described, where the parting line is horizontally disposed, is manufacture of the mold parts in the vicinity of the parting line becomes difficult and expensive due to the criticality in curvature in these areas; and if the mold becomes knicked or otherwise damaged in the parting line area, as may frequently occur, further imperfections and problems in the sealing area of the completed O-ring are encountered.

A still further difficulty encountered in the above conventional O-ring manufacturing procedures, is that if the mold parts are not accurately aligned during the molding operation, or are not produced with adequate precision, the aberration which occurs in the finished O-ring between the upper and lower O-ring body sections occurs at the parting line, which as above set forth, is disposed at the critical sealing area of the finished product.

In accordance with the present invention, the mold parts are so constituted and fabricated that a major portion of the O-ring body will be formed within one mold part, and a minor portion of the O-ring body will be formed within the other mold part; the mold parting line in the finished product thus being offset or remotely disposed with respect to the sealing surfaces of the finished ring structure. Also, the sealing surfaces, which will be formed within the mold part encompassing the larger body portion, are cylindrical in shape so as to provide flattened sealing surfaces along the outer and inner peripheral areas of the ring, and sealing surfaces which are free of flash and other deformities. Such cylindrical surfaces may be readily formed in the mold, by conventional tooling procedures, and if knicks or damage should occur in the molds, in the vicinity of the parting line, resulting aberrations or deformities within the sealing area will not be produced.

Also, if the mold parts are not properly aligned during the molding operation, or if the mold members are made with some lack of precision, the aberration which occurs does not affect the sealing surface of the finished O-ring product. By reason of these considerations, the mold parts may be more readily and economically formed; and the resulting O-ring product will be superior in performance.

It is an object of the present invention to provide an O-ring structure of improved construction and performance. More specifically stated, it is an object of the invention to provide an O-ring structure having improved and more efficient sealing surfaces, externally and internally thereof; and surfaces which are free of aberrations, such for example as flash and knicks due to mold imperfections.

A further object of the invention is to provide molding apparatus and methods, for the manufacture of O-rings, wherein the molds may be more readily and economically produced, and which will provide an improved O-ring structure.

Various other objects, advantages and features of the invention will be apparent from the following specification, when taken in connection with the accompanying drawings, wherein certain preferred embodiments of the invention are set forth for purposes of illustration.

DRAWINGS

In the drawings, wherein like reference numerals refer to like parts throughout:

FIG. 1 is a general assembly view of a mold structure, such as may be used for the compression molding of O-rings, in accordance with the principles of the present invention;

FIG. 2 is an enlarged cross-section through the mold parts, for making O-rings of the present invention, the mold parts being shown in open position;

FIG. 3 is a view similar to FIG. 2, but showing the mold parts closed;

FIG. 4 is a detail cross-sectional view, further enlarged in scale, showing the mold parts slightly separated, and more particularly illustrating the mold cavities;

FIG. 5 is a view similar to FIG. 4, but showing the mold parts closed;

FIG. 6 is a view showing the mold parts, in association with a completed O-ring;

FIG. 7 is a sectional view of the ring produced;

FIG. 8 is a perspective view thereof;

FIG. 9 is a view similar to FIG. 6, but showing a modified form of mold structure;

FIG. 10 is a view of the O-ring as produced by the mold of FIG. 9;

FIG. 11 is a perspective view thereof; and

FIGS. 12 and 13 are views illustrating mold structures and methods of the prior art.

PRIOR ART

Referring to FIGS. 12 and 13, FIG. 13 shows what is perhaps the most conventional procedure in the compression molding of O-rings in accordance with the prior art. A mold structure is shown consisting of an upper mold member 10, and a lower mold member 12, arranged to effect the compression molding of an O-ring such as indicated at 14. It will be seen that the parting line 16 between the molds falls directly at the normally used outer and inner sealing surfaces of the O-ring, indicated by the reference numerals 18 and 20. It will be seen that any flash formed during the compression molding operation, will lie directly along the sealing surfaces; and any dents or aberrations in the mold cavity along the parting line, will produce aberrations and imperfections along the sealing surfaces as well. Further difficulties are presented in that the curvature surfaces of the mold members in the vicinity of the parting line, are difficult to formulate and machine. Any misalignment of the mold members produces aberrations at the parting line, and along the O-ring sealing surfaces.

In FIG. 12 is shown an expedient used in certain molding methods heretofore used. In this instance the upper mold member 10a is provided with a conical projection 22 which fits into a conical recess in the lower mold member 12a, so that the parting line 16a between the mold members will be disposed at an angle in respect to the horizontal, in the instance shown approximately forty-five degrees. This expedient removes the parting line from the normal sealing surfaces of the O-ring, but provides difficulty and expense in the making of the mold members, and particularly in effecting a proper fit therebetween.

DISCLOSURE

Referring to the embodiments of the present invention, set forth for purposes of illustration, in FIG. 1 a compression mold assembly is illustrated consisting of an upper mold member 22 and a lower mold member 24, provided with comating mold cavities, and with locating or alignment pin apertures as indicated at 26, of any conventional design.

Referring to FIG. 2, an annular mold cavity 28 in the upper member is more particularly shown, as is the annular mold cavity 30 in the lower mold member 24. Annular wells 32, of conventional character, are disposed in the lower mold member, in juxtaposition to the mold cavity 30, for receiving excess material during the compression molding operation, as will be understood.

Referring to FIG. 3, the mold members 22 and 24 are shown in closed position, the position assumed to effect a molding operation after a preform has been introduced into the lower mold cavity, whereby an annular O-ring may be formed.

Referring to FIGS. 4 and 5, the mold cavities 28 and 30 are more particularly illustrated. Referring to FIG. 4, it will be seen that mold cavity 28 in the upper mold member is smaller, and forms something less than one-half of the O-ring body, whereas the cavity 30 in the lower mold member forms the greater portion of the O-ring body, and is composed of two parts, viz., a circular portion 33, and an annular or cylindrical portion 34.

As best shown in FIG. 5, the diameter "A" of the cylindrical surface 34 is somewhat greater than the maximum diameter "B" of the upper mold surface 28, whereby to provide an annular shoulder or step 36 at the parting line between the mold members, of predetermined dimension. This shoulder preferably may have a dimension from zero up to a predetermined amount, which facilitates a tolerance in the making and alignment of the molds, without sacrifice in quality of the O-ring produced. More particularly, if the dimension A is made somewhat larger than dimension B, then any misalignment of the mold members, in reasonable degree, or inaccuracy in the sizing of the mold cavities, produces only a variation in the width of the shoulder 36 at various points along the O-ring periphery, without sacrifice in accuracy and positioning of the cylindrical sealing surface of the O-ring produced by cylindrical mold surface 34.

The cylindrical surface 34 may be readily formed in the lower mold member by conventional machining methods. The width or height of the cylindrical surface may be formed of any desired magnitude, depending upon the intended use for the particular O-ring involved.

In accordance with the invention, as shown in FIGS. 4 and 5, curvature aberrations in the surfaces 28 or 32 are of relative inconsequence, because the sealing surface of the O-ring is essentially formed by the cylindrical surface 34, which may be readily and accurately formed. Thus the mold member cavities may be more economically produced. Compensation for aberrations and misalignment is also effected by the shoulder 36, as previously set forth.

Flash which may be formed along the mold parting line 38 is of relative inconsequence, because it does not occur within the sealing surface. Similarly, knicks or the like which may occur along the lips of the mold cavities, are not within the mold portions forming the cylindrical sealing surface, and thus also are of inconsequence in influence upon the performance of the finished product.

Referring to FIG. 6, the mold members 22 and 24 are shown in association with a completed O-ring, indicated by the reference numeral 40, the O-ring being provided with a cylindrical bearing surface along the outer periphery, as indicated by the reference numeral 42, and along the inner periphery, as indicated by the reference numeral 44. The formed O-ring is shown in FIG. 7 in section, and in perspective in FIG. 8.

A modified embodiment is illustrated in FIGS. 9-11. In this instance, as illustrated in FIG. 9, the upper mold member 22a and the lower mold member 24a are provided with additional flattened surfaces within their respective mold cavities, whereby upon the compression molding operation, the produced O-ring 40a will be provided not only with flattened cylindrical sealing surfaces as indicated at 42 and 44, but also with flattened sealing or bearing surfaces along the upper and lower peripheral body portions, as indicated respectively by the reference numerals 46 and 48. The completed O-ring is shown in section in FIG. 10, and in perspective in FIG. 11.

In service, the O-ring of the present invention provides an improved sealing function in that compression of the O-ring material is not required to provide a widened or flat bearing surface along the bearing or sealing areas 42 and 44. Further, as previously set forth, the width of the bearing or sealing areas may be adjusted and controlled in accordance with the particular service of the O-ring involved.

It is obvious that changes may be made in the specific forms disclosed without departing from the spirit of the invention.

The invention is claimed as follows:

1. An O-ring comprising a molded resilient body annularly disposed about an axis, said body prior to use being generally round in radial cross-section and being provided with a molded annular flattened area axially extending along one peripheral surface.

2. An O-ring as defined in claim 1, wherein the body is provided with a molding parting line along one margin of said annular flattened area.

3. An O-ring as defined in claim 1, wherein the body is provided with a second annular flattened area axially extending along a second peripheral surface thereof.

4. An O-ring as defined in claim 3, wherein said areas are disposed along the outer and inner peripheral surfaces of the body.

5. An O-ring as defined in claim 4, wherein the body is provided with a molding parting line along a margin of each of said annular flattened areas.

6. An O-ring as defined in claim 1, wherein the body is provided with a plurality of additional flattened areas extending along additional peripheral surfaces of the body.

* * * * *